United States Patent
Suzuki et al.

(10) Patent No.: US 7,848,275 B2
(45) Date of Patent: Dec. 7, 2010

(54) MOBILE TERMINAL, WIRELESS COMMUNICATIONS SYSTEM AND MOBILE TERMINAL CONTROL METHOD

(75) Inventors: Toshihiro Suzuki, Yokohama (JP); Motonari Kobayashi, Yokohama (JP); Ashiq Khan, Yokosuka (JP); Wataru Takita, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 613 days.

(21) Appl. No.: 11/672,767

(22) Filed: Feb. 8, 2007

(65) Prior Publication Data
US 2007/0189257 A1 Aug. 16, 2007

(30) Foreign Application Priority Data

Feb. 8, 2006 (JP) ............ P2006-031609
Aug. 2, 2006 (JP) ............ P2006-211329

(51) Int. Cl.
*H04B 7/14* (2006.01)

(52) U.S. Cl. .............. 370/315; 370/311; 455/574

(58) Field of Classification Search ........... 455/574; 370/311, 406, 338, 315–318
See application file for complete search history.

(56) References Cited

U.S. PATENT DOCUMENTS

| | | | |
|---|---|---|---|
| 2004/0033778 A1* | 2/2004 | Fonseca et al. | 455/11.1 |
| 2004/0063451 A1* | 4/2004 | Bonta et al. | 455/519 |
| 2004/0233881 A1 | 11/2004 | Kang et al. | |
| 2006/0268891 A1* | 11/2006 | Heidari-Bateni et al. | 370/395.4 |

FOREIGN PATENT DOCUMENTS

| | | |
|---|---|---|
| GB | 2 405 056 | 2/2005 |
| JP | 2005-160062 | 6/2005 |
| JP | 2005-303896 | 10/2005 |

OTHER PUBLICATIONS

Buttyan, L., & Hubaux, Jean-Pierre (Oct. 2003). "Stimulating Cooperation in Self-Organizing Mobile Ad Hoc Networks" Mobile Networks and Applications, vol. 8, pp. 579-592.*
V. Rodoplu & M. K. Park. An Energy-Efficient MAC Protocol for Underwater Wireless Acoustic Networks. In Proceedings MTS/IEEE OCEANS. Sep. 2005.*

* cited by examiner

*Primary Examiner*—Kent Chang
*Assistant Examiner*—Marcus Hammonds
(74) *Attorney, Agent, or Firm*—Oblon, Spivak, McClelland, Maier & Neustadt, L.L.P.

(57) ABSTRACT

A mobile terminal configured to constitute an ad hoc network together with a plurality of other terminals, the mobile terminal includes a packet relay unit configured to execute a relay operation of relaying a packet transferred between the other terminals. A packet transmitter is configured to execute a transmission operation of transmitting a packet generated in the mobile terminal to any one of the other terminals. A power supply manager is configured to execute a power supply control operation. A coordination controller is configured to cause the relay operation and the power supply control operation to be coordinated with each other, and to selectively control whether each of the relay operation, the transmission operation and the power supply control operation is executed.

11 Claims, 17 Drawing Sheets

MOBILE TERMINAL, WIRELESS COMMUNICATIONS SYSTEM AND MOBILE TERMINAL CONTROL METHOD

CROSS REFERENCE TO RELATED APPLICATION

This application is based upon and claims the benefit of priority from prior Japanese Patent Application P2006-31609 filed on Feb. 8, 2006, and P2006-211329 filed on Aug. 2, 2006; the entire contents of which are incorporated by reference herein.

BACKGROUND OF THE INVENTION

1. Field of the Invention

The present invention relates to a mobile terminal constituting an ad hoc network together with a plurality of the terminals, a wireless communication system including the mobile terminal, and a mobile terminal control method for controlling the mobile terminal.

2. Description of the Related Art

An "ad hoc network" composed of a plurality of autonomous distributed mobile terminals each having a wireless communication function and a routing function, has been known. By adopting the ad hoc network, a network can be composed of only mobile terminals without depending on a base station, a backbone network and the like which are used in a wireless communication system. A secure routing technique and the like using a key exchange and management technique, access control and keys have been studied in order to achieve secure communications in the ad hoc network.

Meanwhile, methods have been disclosed as a technique for coordinating a routing process and a power supply control process with each other. In one of the methods, when a terminal receives a packet, a packet relay unit, a control unit or the like in the terminal is selectively powered on and off for the purpose of saving battery consumption, according to whether the received packet as a packet to be relayed or to be handled in the terminal itself (refer to Japanese Patent Application Publication No. 2005-303896). Moreover, another one of the methods has been disclosed. In this method, a certain route with which the costs for electric power is the lowest is selected, firstly by measuring the amount of remaining electric power at each node on a network, and then by calculating the electric power costs concerning each route from the amounts of the remaining electric powers of the respective nodes (refer to Japanese Patent Application Publication No. 2005-160062).

However, in a case of using the foregoing techniques for coordinating the routing process and the power supply control process with each other, a transmission path may sometimes be lost. This is because a user may turn on the power of a mobile terminal only when the user sends his/her own packets, and turn of the power in the other occasions. Such a selfish operation may results in a loss of a transmission path and in a trouble that another mobile terminal fails to transmit its own packets. For the reason, there has been a problem that the fairness in communications cannot be ensured because the network performance of an ad hoc network deteriorates due to such a self-serving operation by a user.

SUMMARY OF THE INVENTION

In consideration of the foregoing problem, the present invention provides a mobile terminal, a wireless communication system and a mobile terminal control method, which are capable of preventing the network performance of an ad hoc network from deteriorating, and of ensuring the fairness in communications.

A first aspect of the present invention is a mobile terminal configured to constitute an ad hoc network together with a plurality of other terminals, comprising a packet relay unit configured to execute a relay operation of relaying a packet transferred between the other terminals; a packet transmitter configured to execute a transmission operation of transmitting a packet genera ted in the mobile terminal itself (self terminal) to any one of the other terminals; a power supply manager configured to execute a power supply control operation; and a coordination controller configured to cause the relay operation and the power supply control operation to be coordinated with each other, wherein the coordination controller selectively controls whether each of the relay operation, the transmission operation and the power supply control operation is executed. Here, "to perform the relay operation" means that a routing protocol is operated.

In the first aspect of the present invention, the coordination controller may reject a packet transmission request from the packet transmitter during a predetermined time period after power-on, and causes only the relay operation to be executed.

In the first aspect of the present invention, the mobile terminal may further include a determination unit configured to determine the predetermined time period in accordance with any one of an operation time of the packet relay unit, the number of packets relayed by the packet relay unit, a node density in the ad hoc network, and a traffic amount in the ad hoc network.

In the first aspect of the present invention, the coordination controller may reject a power-off request from the power supply manger and a packet transmission request from the packet transmitter, and causes only the relay operation to be executed during a predetermined time period after completion of the transmission operation.

In the first aspect of the present invention, the mobile terminal may further include a determination unit configured to determine the predetermined time period in accordance with any one of an operation time of the packet relay unit, the number of packets relayed by the packet relay unit, the node density in the ad hoc network, and the traffic amount in the ad hoc network.

In the first aspect of the present invention, the power supply manager may detect the amount of remaining power at power-on, and the coordination controller may reject a packet transmission request from the packet transmitter, and causes only the relay operation to be executed, when the amount of remaining power is less than a fixed amount.

In the first aspect of the present invention, the power supply manager may detect the amount of remaining power at power-on, and the coordination controller may cause both of the relay operation and the transmission operation not to be executed when the amount of remaining power is less than a fixed amount.

In the first aspect of the present invention, the packet relay unit may determine whether the mobile terminal holds an active route, and the coordination controller may reject a power-off request from the power supply manager when the mobile terminal holds the active route. Here, "holding an active route" refers to, for example, holding a routing table, or executing an operation of relaying a data packet.

In the first aspect of the present invention, the packet relay unit may determine whether the mobile terminal holds an active route, and the coordination controller may issue an instruction to the packet relay unit to execute a power-off advance notice process for prompting the other terminals to switch to another route for the purpose of permitting power-off when the power supply manager requests power-off while the mobile terminal holds the active route.

A second aspect of the present invention is a wireless communication system, comprising a plurality of mobile terminals configured to constitute an ad hoc network; and a core network configured to control the mobile terminals, wherein each of the mobile terminals comprises a packet relay unit configured to execute a relay operation of relaying a packet transferred between the other terminals; a packet transmitter configured to execute a transmission operation of transmitting a packet generated in the mobile terminal to any one of the other terminals; and a power supply manager configured to execute a power supply control operation, wherein the core network causes the relay operation and the power supply control operation to be coordinated with each other, and selectively controls whether each of the relay operation, the transmission operation and the power supply control operation is executed.

A third aspect of the present invention is a mobile terminal control method for controlling a mobile terminal configured to constitute an ad hoc network together with a plurality of other terminals, comprising the steps of executing a relay operation of relaying a packet transferred between the other terminals, executing a transmission operation of transmitting a packet generated in the mobile terminal to any one of the other terminals; executing a power supply control operation; causing the relay operation and the power supply control operation to be coordinated with each other; and controlling whet her each of the relay operation, the transmission operation and the power supply control operation is executed.

According to the present invention, a mobile terminal, a wireless communications network and a mobile terminal control method can be provided, which are capable of preventing the network performance of an ad hoc network from deteriorating, and of ensuring the fairness in communications.

DETAILED DESCRIPTION OF THE INVENTION

Figure 1:
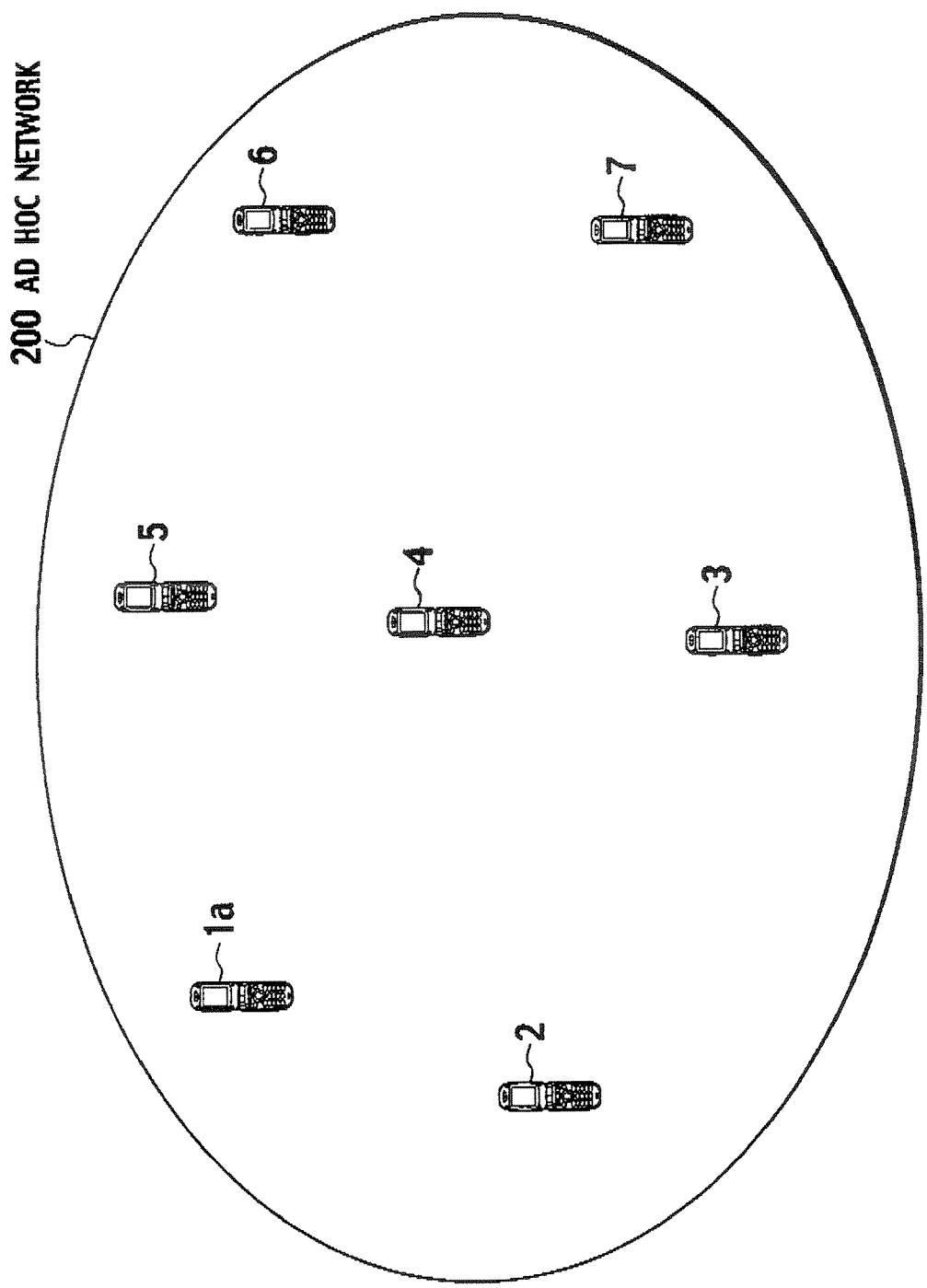
FIG. 1 is a schematic diagram for explaining an ad hoc network composed of a plurality of mobile terminals according to a first embodiment of the present invention.

Hereinafter, first to fourth embodiments of the present invention will be described by referring to the accompanying drawings. The following drawings for the first to fourth embodiments are described by using the same or similar reference numerals for units that are the same as or similar to, those through the embodiments.

FIRST EMBODIMENT

As shown in FIG. 1, a wireless ad hoc communications system according to a first embodiment of the present invention includes a plurality of mobile terminals 1a to 7 which constitute an ad hoc network 200. The ad hoc network 200 thus constituted is a dynamic network in which a communication coverage area is determined in accordance with positional relationships among the mobile terminals 1a to 7. Incidentally, FIG. 1 illustrates a mobiles phone as each of the mobile terminals 1a to 7, but a laptop personal computer (PC), a personal digital assistance (PDA) or the like which has a wireless communication function can be used as each of the mobile terminals 1a to 7.

Figure 2:
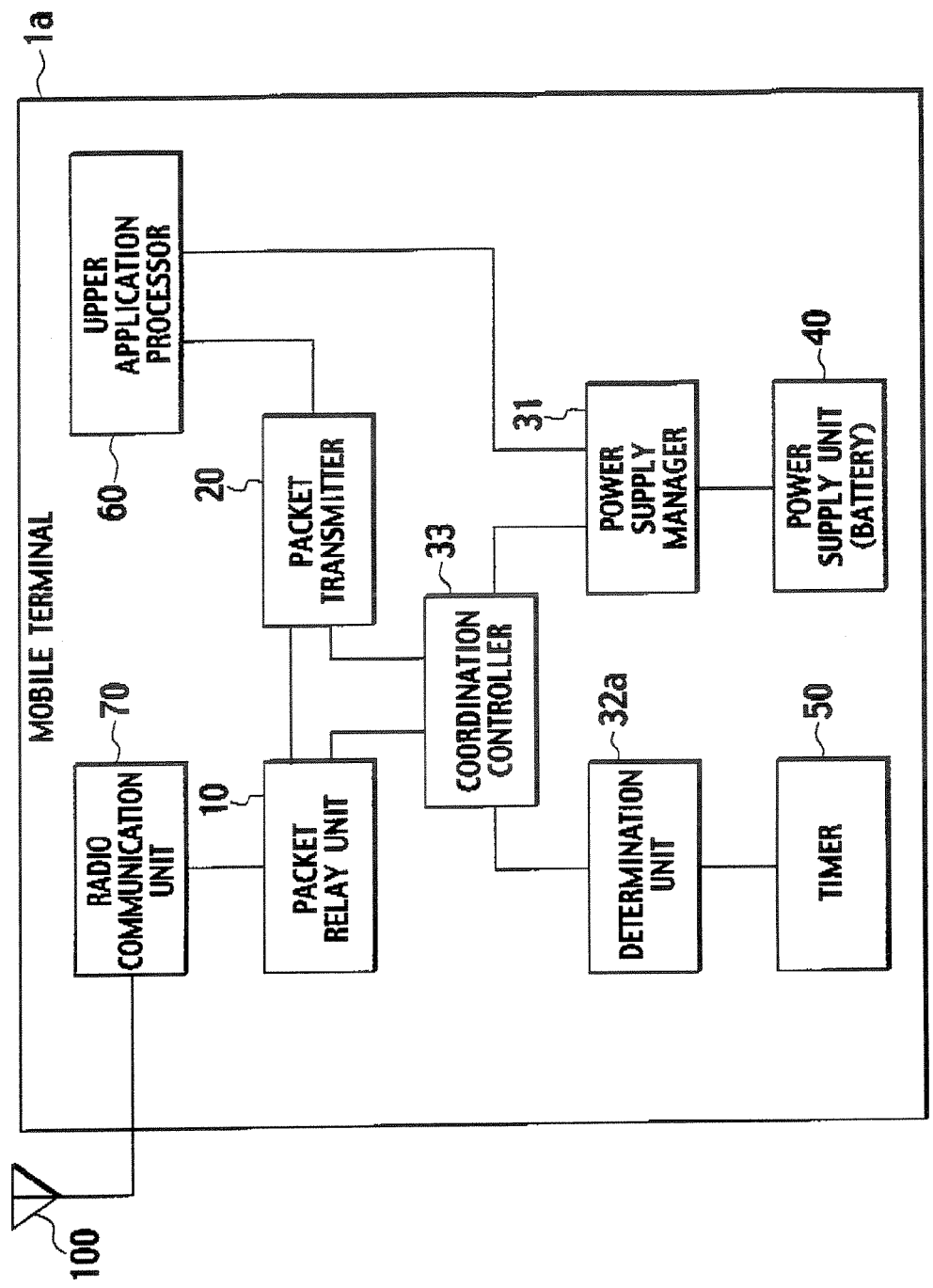
FIG. 2 is a block diagram showing an arrangement example of a mobile terminal according to the first embodiment of the present invention.

As shown in FIG. 2, the mobile terminal 1a includes a packet relay unit 10, a packet transmitter 20, a power supply manager 31, a coordination controller 33, a power supply unit (a battery) 40, a timer 50, a radio communication and 70, a determination unit 32a, an upper application processor 60 and an antenna 100. The radio communication unit 70 performs radio communications via the antenna 100. The power supply unit 40 supplies power to each functional block in the mobile terminal 1a. The packet relay unit 10 performs an operation of relaying a packet transferred between other terminals. Here, "to perform a relay operation" refers to implement a routing protocol such as the AODV routing protocol (as for the AODV routing protocol, refer to IETF RFC 3561 "Ad hoc On-Demand Distance Vector (AODV) Routing").

The upper application processor 60 processes an upper application (an upper layer). The packet transmitter 20 transmits a packet generated by the upper application processor 60 to another terminal. The power supply manager 31 performs an operation for managing the power supply unit 40 (hereinafter, referred to as a "power supply management operation"). The coordination controller 33 coordinates the relay operation and the power supply management operation with each other, and selectively controls whether a relay operation, a transmission operation, or a power supply management operation is to be executed.

The timer 50 measures time. The determination unit 32a determines whether the timer 50 measures a predetermined time (fixed time) period. Specifically, the determination unit 32a holds a threshold value (reference time period) used for comparison with the time period measured by the timer 50, and determines that the fixed time period has passes when the measured time exceeds the threshold value (reference time period). The coordination controller 33 rejects a packet transmission request from the packet transmitter 20, and causes only the relay operation to be executed until the fixed time period passes after power-on.

Note that the power supply manager 31 is configured to be capable of controlling whether the power is to be supplied to each functional block in the mobile terminal 1a. For example, the power manager 31 allows only a communication function in the mobile terminal 1a to be powered off. Thus, in the following descriptions, "power-off" does not only mean the power-off of the whole mobile terminal 1a, but also includes the power-off of the packet relay unit 10 and the radio communication unit 70.

The packet relay unit 10 has a routing function for performing a setup operation for making a connection to another terminal, and the relay operation for relaying a packet transferred between the other terminals. The setup operation for setting a connection to another terminal includes an operation for searching for a mobile terminal at the other end of communication at the start of the communication, and an operation for establishing a path to the mobile terminal at the other end of the communication. Both operations are performed by using a radio communication function of the radio communication unit 70. Incidentally, the packet relay unit 10 generates a routing table by executing the routing protocol, and holds the routing table thus generated.

The packet transmitter 20 has a function of interfacing with the upper application processor 60. To be more precise, when the mobile terminal 1a operates and thus communicates with another terminal with an application (the upper application processor 60) operated by the mobile terminal 1a, the packet transmitter 20 operates as an interface between the application (the upper application processor 60) and the routing function (the packet relay unit 10). In accordance with the routing table managed by the packet relay unit 10, a packet from the packet transmitter 20 is transmitted from the antenna 100 to the outside through the packet relay unit 10 and the radio communication unit 70.

Figure 3:
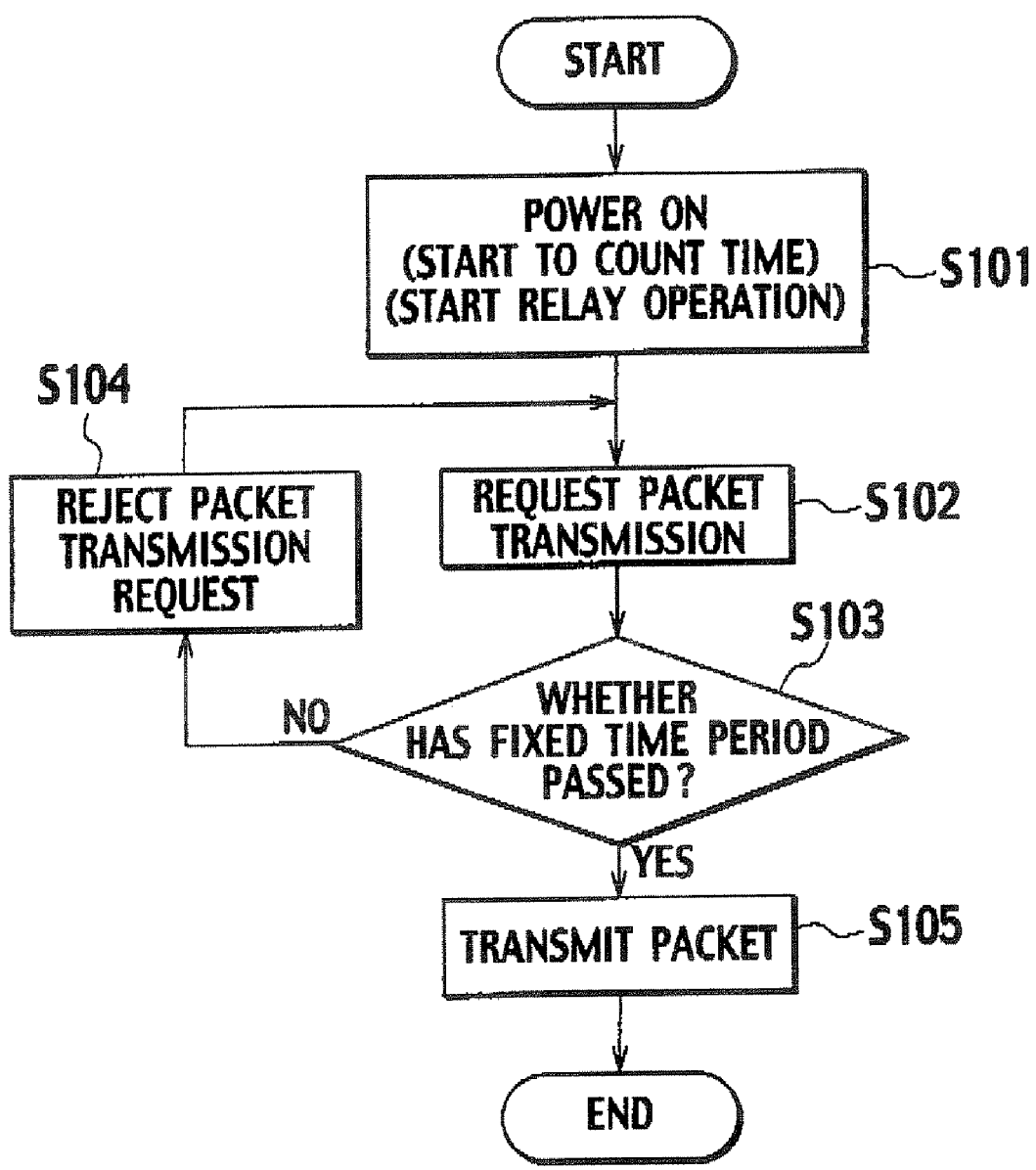
FIG. 3 is a flowchart showing a mobile terminal control method according to the first embodiment of the present invention.

Next, descriptions will be given of a mobile terminal control method according to the first embodiment by referring to a flowchart shown in FIG. 3.

In step S101, upon detection of power-on, the coordination controller 33 issues an instruction to the packet relay unit 10 to start the relay operation, and issues an instruction to the timer 50 to start the time measurement operation.

In step S102, the packet transmitter 20 informs the coordination controller 33 of a packet transmission request.

In step S103, the determination unit 32a determines whether the fixed time period has passed after power-on. When it is determined that the fixed time period has not passed after power-on, the procedure goes to step S104. In step S104, the coordination controller 33 rejects the packet transmission request from the packet transmitter 20.

In contrast, when it is determined that the fixed time period has passed after power-on, the procedure goes to step S105. Then, the coordination controller 33 permits the packet transmission request. Once the packet transmission request is permitted, the packet transmitter 20 transmits the packet through the packet relay unit 10.

In this way, a packet transmission request from the packet transmitter 20 is rejected until the fixed time period passes after power-on, and only the relay operation is permitted. After the fixed time period passes, the transmission operation and the power-off operation are permitted in addition to the relay operation.

Figure 4:
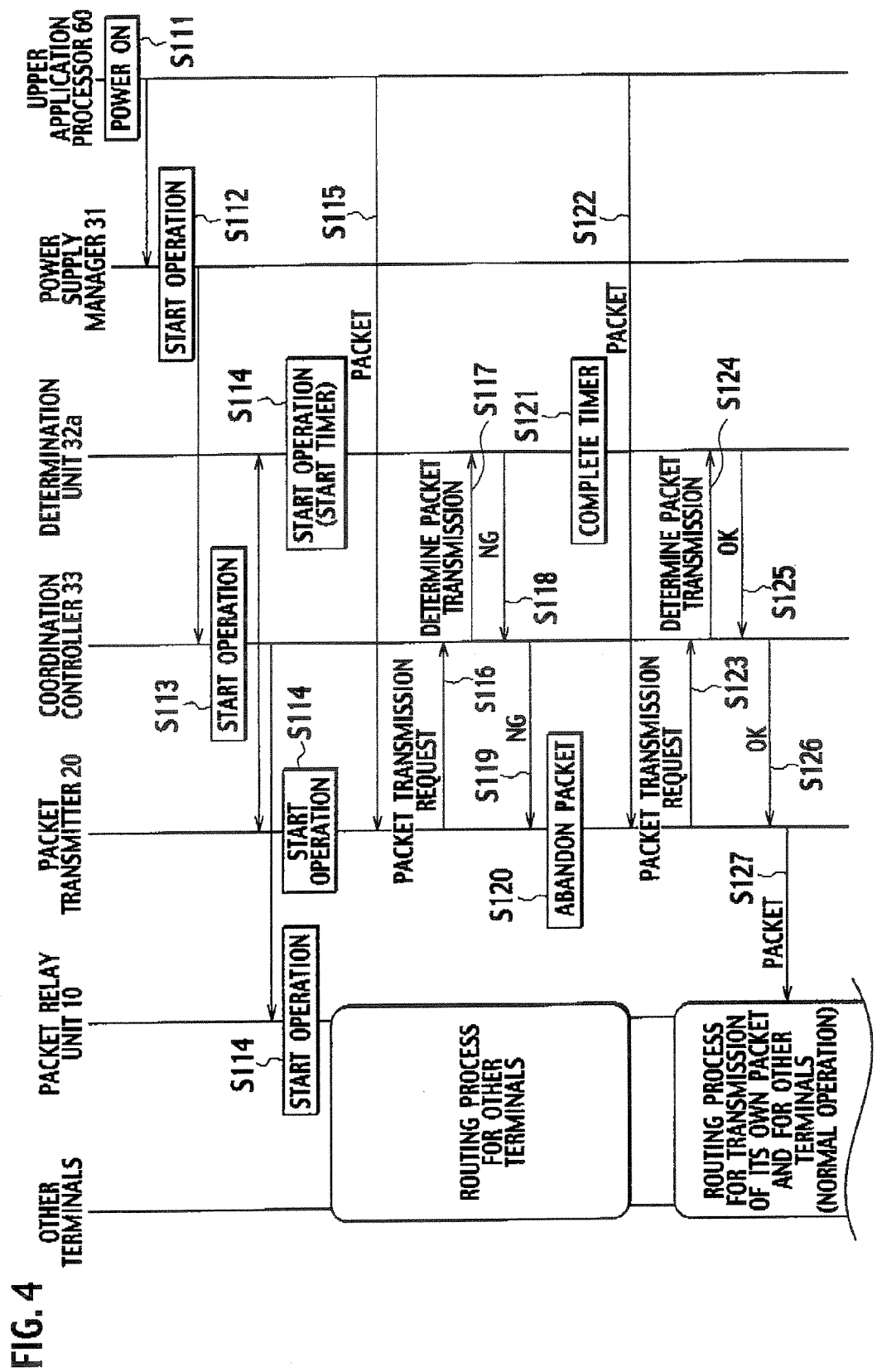
FIG. 4 is a sequence diagram showing the detail operation of the mobile terminal control method according to the first embodiment of the present invention.

Hereinafter, descriptions will be given in detail of the operation of the mobile terminal 1a according to the first embodiment by referring to a sequence diagram shown in FIG. 4.

In step S111, the upper application processor 60 informs the power supply manager 31 that a user has performed a power-on operation.

In step S112, the power supply manager 31 causes the power supply unit 40 to supply the power to each functional blocks in the mobile terminal 1a, and informs the coordination controller 33 that the operation for applying the power to each functional block is executed.

In step S113, the coordination controller 33 issues an instruction to the packet relay and 10, the packet transmitter 20 and the determination and 32a to start operations thereof.

In step S114, the packet relay unit 10, the packet transmitter 20 and the determination and 32a start the operations thereof. Consequently, the packet relay unit 10 starts to perform the relay operation. In addition, the determination unit 32a causes the timer 50 to start the time measurement operation.

In step S115, a packet generated by the upper application processor 60 is transmitted to the packet transmitter 20. The packet thus transmitted is temporarily held in the packet transmitter 20.

In step S116, the packet transmitter 20 informs the coordination controller 33 of a packet transmission request.

In step S117, the coordination controller 33 inquires of the determination unit 32a whether the time period measured by the timer 50 exceeds the threshold value (reference time period).

In step S118, the determination unit 32a informs the coordination unit 33 that the time period measured by the timer 50 does not exceed the threshold value (reference time period).

In step S119, the coordination unit 33 informs the packet transmitter 20 that the packet transmission request is rejected.

In step S120, the packet transmitter 20 abandons the packet held therein.

In step S121, the determination unit 32a determines that the time period measured by the timer 50 exceeds the threshold value (reference time period).

In step S122, the packet generated by the upper application processor 60 is transmitted to the packet transmitter 20. The packet generated by the upper application processor 60 is temporarily held in the packet transmitter 20.

In step S123, the packet transmitter 20 informs the coordination controller 33 of a packet transmission request.

In step S124, the coordination controller 33 inquires of the determination unit 32a whether the time period measured by the timer 50 exceeds the threshold value (reference time period).

In step S125, the determination unit 32a informs the coordination controller 33 that the time period measured by the timer 50 exceeds the threshold value (reference time period).

In step S126, the coordination controller 33 informs the packet transmitter 20 that the packet transmission request is permitted.

In step S127, the packet transmitter 20 transmits the packet held therein to another terminal through the packet relay unit 10 and the like.

As has been described in detail, the mobile terminal 1a according to the first embodiment executes only the relay operation until the fixed time period passes after power-on. Accordingly, the mobile terminal 1a does not allow the selfish operation by a user, and this makes it possible to prevent the network performance from deteriorating, and to ensure the fairness in communications.

Moreover, it is possible to adopt an arrangement in which the amount of the remaining power of the power supply unit 40 is considered. For example, the power supply manager 31 detects the amount of the remaining power at power-on. Then, when the amount of the remaining power is less than a fixed amount, the coordination controller 33 rejects a packet transmission request from the packet transmitter 20, and allows only the relay operation to be executed.

Alternatively, the power supply manager 31 detects the amount of the remaining power at power-on. Then, when the amount of the remaining power is less than the fixed amount, the coordination controller 33 may not allow either of the relay operation and the transmission operation to be executed.

First Modification of First Embodiment

Figure 5:
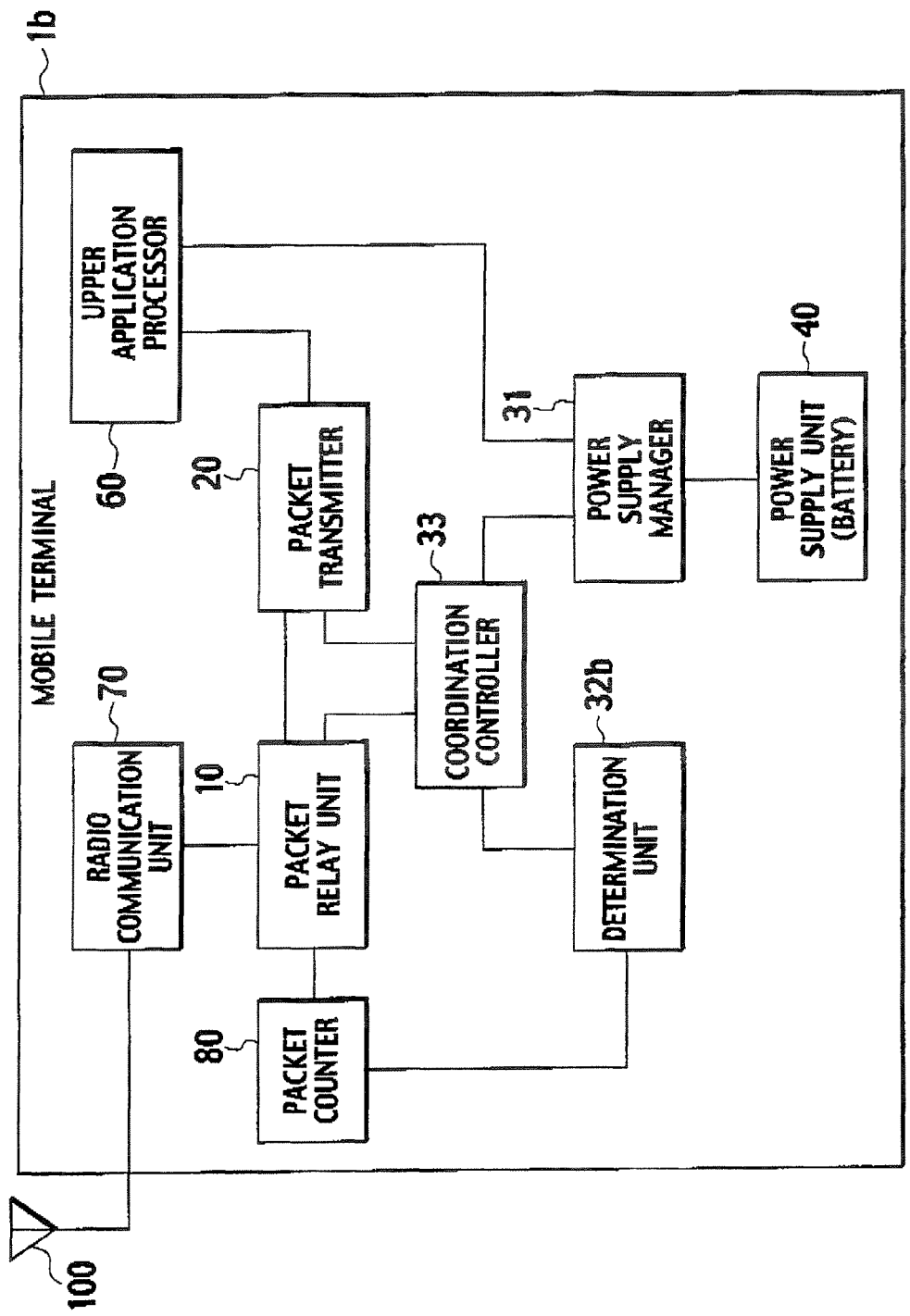
FIG. 5 is a block diagram showing an arrangement example of a mobile terminal according to a first modification of the first embodiment of the present invention.

As shown in FIG. 5, a mobile terminal 1b according to a first modification of the first embodiment of the present invention is different from that shown in FIG. 2 in that the mobile terminal 1b further includes a packet counter 80 configured to court the number of packets which a packet relay unit 10 has relayed. A determination unit 32b holds a threshold value used for comparison with the number of packets counted by the packet counter 80, and determines that a fixed time period has passed when the number of relayed packets exceeds the threshold value. The other parts of the arrangement are the same as those in the mobile terminal 1a shown in FIG. 2.

Figure 6:
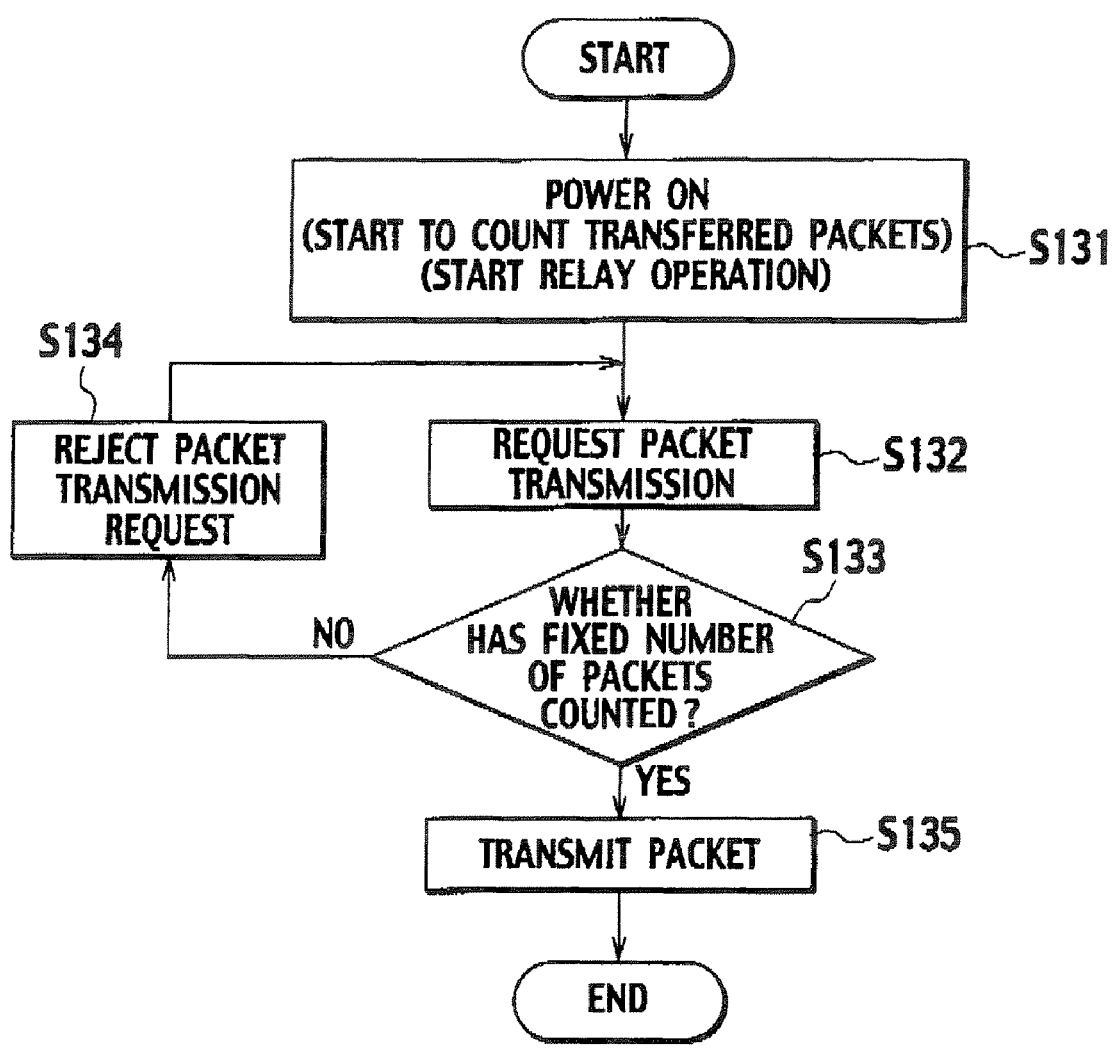
FIG. 6 is a flowchart showing a mobile terminal control method according to the first modification of the first embodiment of the present invention.

Hereinafter, descriptions will be given of a mobile terminal control method according to the first modification of the first embodiment by referring to a flowchart shown in FIG. 6.

In step S131, upon detection of power-on, a coordination controller 33 issues an instruction to the packet relay unit 10 to start the relay operation, and issues an instruction to the packet counter 80 to start to count the number of relayed packets.

In step S132, a packet transmitter 20 informs the coordination controller 33 of a packet transmission request.

In step S133, according to the number of relayed packets counted by the packet counter 80, the determination unit 32b determines whether the packet counter 80 has counted up to the fixed number of the relayed packets, that is, the fixed time period has passed after power-on. When it is determined that the fixed time period has not passed after power-on, the procedure goes to step S134. In step S134, the coordination controller 33 rejects the packet transmission request from the packet transmitter 20.

In contrast, when it is determined in step S133 that the fixed time period has passed after power-on, the procedure goes to step S135, and the coordination controller 33 permits the packet transmission request. Once the packet transmission request is permitted, the packet transmitter 20 transmits the packet to another terminal through the packet relay unit 10 and a radio communication unit 70.

As has been described above, the mobile terminal 1b according to the first modification of the first embodiment starts to count the number of relayed packets at power-on, and executes only the relay operation during a time period until the counted number of the relayed packets exceeds the threshold value. Accordingly, as is the case with the first embodiment, it is possible to prevent the network performance from deteriorating, and to ensure the fairness in communications.

Second Modification Of First Embodiment

Figure 7:
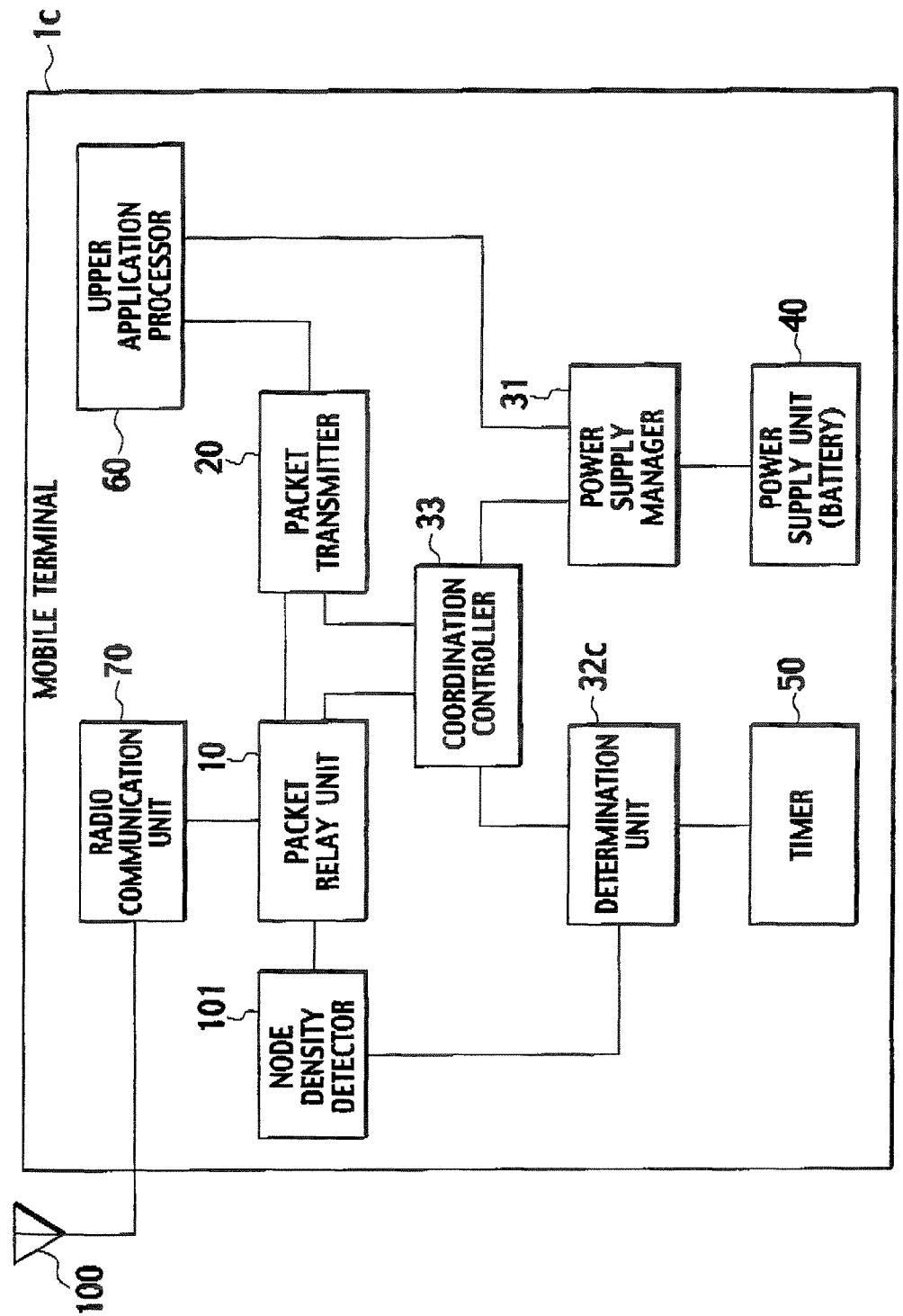
FIG. 7 is a block diagram showing an arrangement example of a mobile terminal according to a second modification of the first embodiment of the present invention.

As shown in FIG. 7, a mobile terminal 1c according to a second modification of the first embodiment of the present invention is different from that shown in FIG. 2 in that the mobile terminal 1c further includes a node density detector 101 configured to detect the node density in an ad hoc network 200. The node density detector 101 is configured to change a threshold value (reference time period) set in a determination unit 32c according to the node density in the ad hoc network 200.

For example, the node density detector 101 transmits predetermined radio waves (packets) from the self mobile terminal 1c to a fixed area range, and detects the node density by using the number of replies transmitted from the other terminals that exist around the mobile terminal 1c.

To take an example, when the node density in the ad hoc network 200 is high (the number of mobile terminals is large), the node density detector 101 shortens the fixed time period for executing only the relay operation. This is because, even if the mobile terminal 1c is powered off and a path through the mobile terminal 1c is lost, it can be expected that another path be reconstructed through a different terminal in a case of the high node density.

In contrast, when the node density in the ad hoc network 200 is low (the number of mobile terminals is small), the node density detector 101 elongates the fixed time period for executing only the relay operation. This is because, if the mobile terminal 1c is powered off and a path through the mobile terminal 1c is lost, it is relatively difficult to reconstruct another path through another terminal in a case of the low node density.

Figure 8:
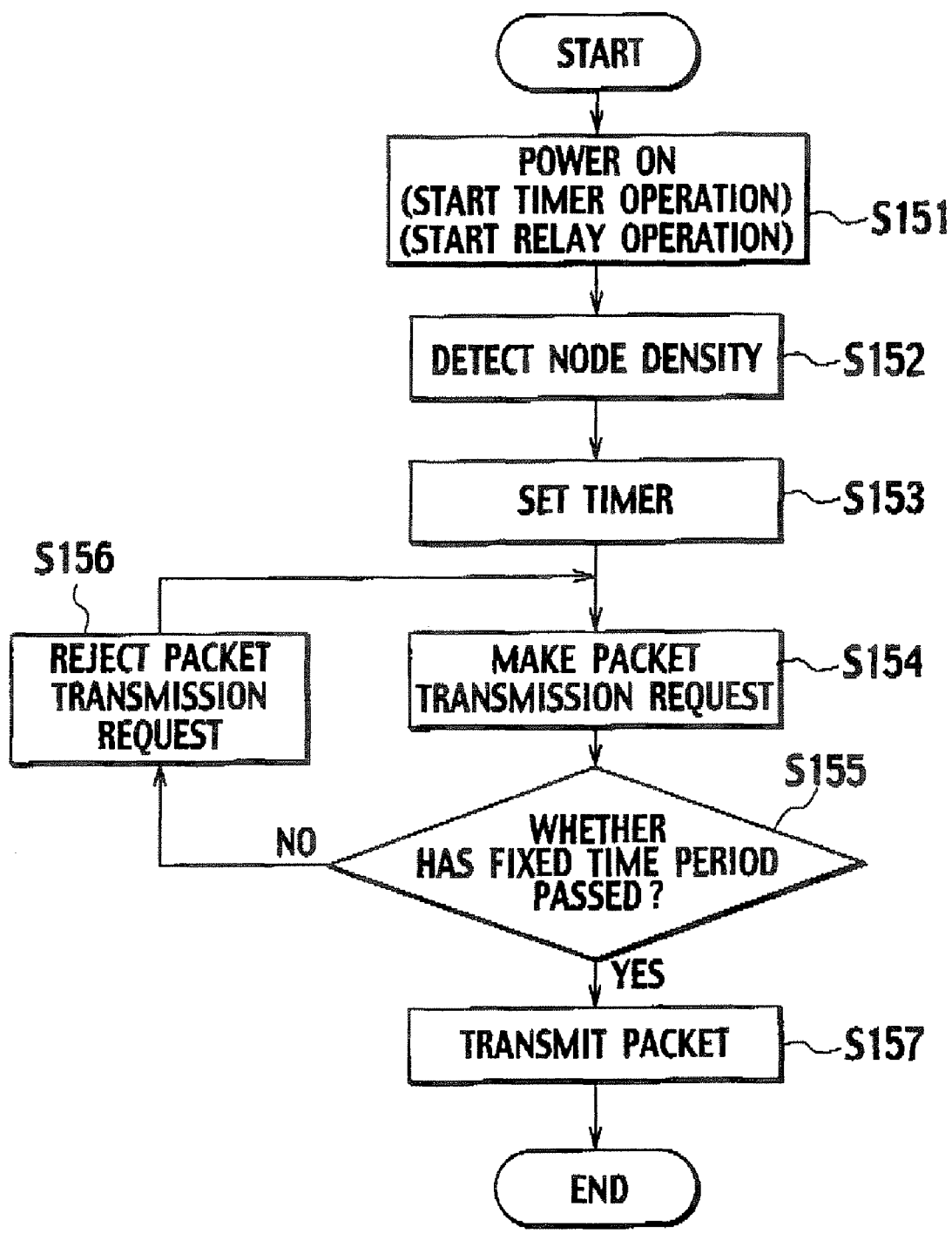
FIG. 8 is a flowchart showing a mobile terminal control method according to the second modification of the first embodiment of the present invention.

Hereafter, descriptions will be given of a mobile terminal control method according to the second modification of the first embodiment by referring to a flowchart shown in FIG. 8.

In step S151, once the power is turned on, the coordination controller 33 issues an instruction to a packet relay unit 10 to start the relay operation, and issues an instruction to a timer 50 to start the time measurement operation.

In step S152, the node density detector 101 detects the node density.

In step S153, the node density detector 101 sets the threshold value (reference time period) in the determination unit 32c according to the node density detected in step S152.

In step S154, a packet transmitter 20 informs the coordination controller 33 of a packet transmission request.

In step S155, the determination unit 32c determines whether the time period measured by the timer 50 exceeds the threshold value (reference time period), that is, the fixed time period has passed after power-on. When it is determined that the fixed time period has not passed, the procedure goes to step S156. In step S156, the coordination controller 33 rejects the packet transmission request from the packet transmitter 20.

In contrast, when it is determined in step S155 that the fixed time period has passed after power-on the procedure goes to step S157, and the coordination controller 33 permits the packet transmission request from the packet transmitter 20.

Once the packet transmission request is permitted, the packet transmitter 20 transmits the packet to another terminal through the packet relay unit 10.

As has been described above, the mobile terminal 1c according to the second modification of the first embodiment is capable of adjusting the fixed time period for executing only the relay operation according to the arrangement of the ad hoc network 200.

Third Modification Of First Embodiment

Figure 9:
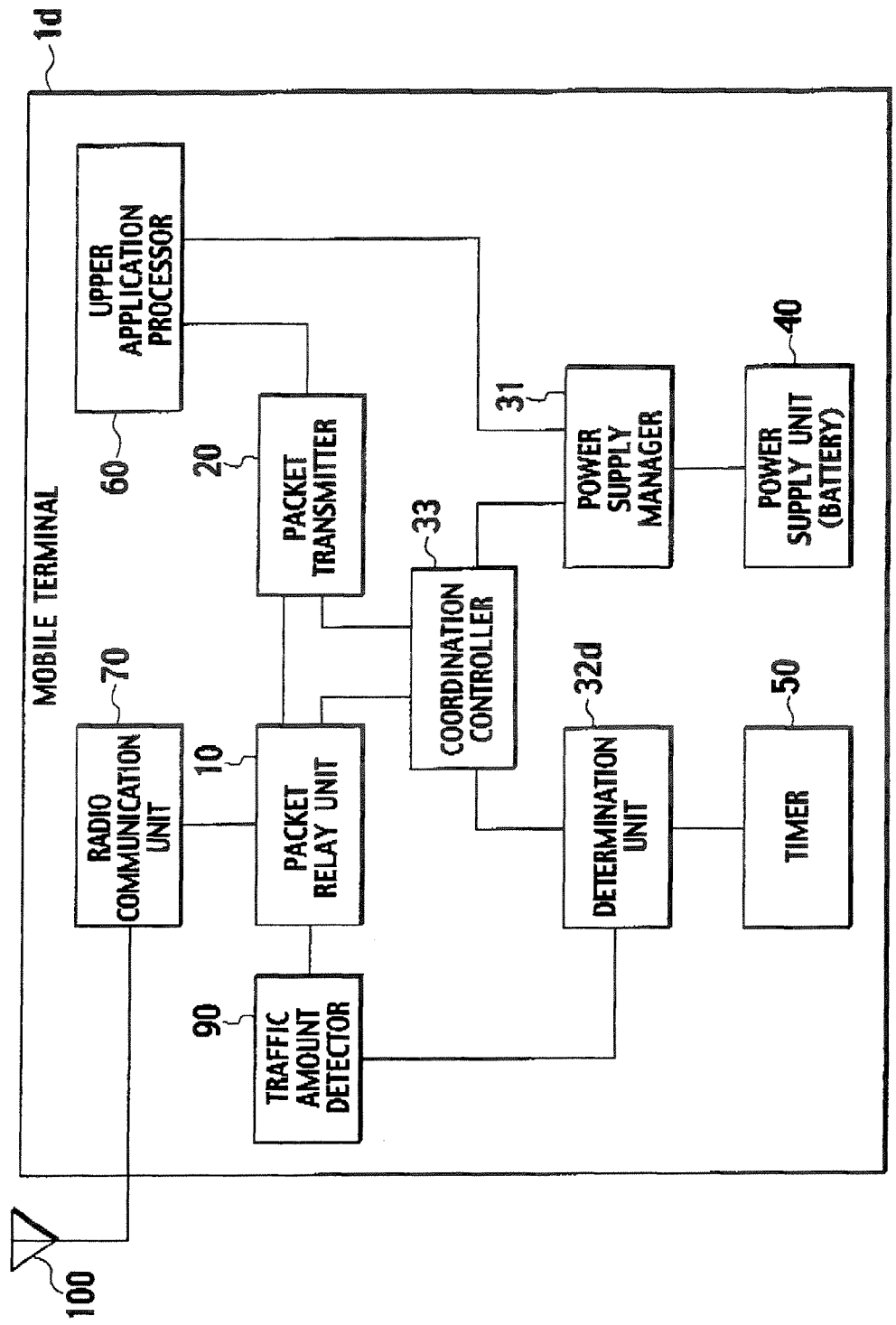
FIG. 9 is a block diagram showing an arrangement example of a mobile terminal according to a third modification of the first embodiment of the present invention.

As shown in FIG. 9, a mobile terminal 1d according to a third modification of the first embodiment of the present invention is different from that shown in FIG. 2 in that the mobile terminal 1d further includes a traffic amount detector 90 for detecting the traffic amount in an ad hoc network 200. The traffic amount detector 90 is configured to change a threshold value (reference time period) set in a determination unit 32d according to the traffic amount in the ad hoc network 200.

The traffic amount detector 90 detects, for example, the number of relayed packets per unit time, and estimates the traffic amount according to the number of the relayed packets per unit time.

For example, when the traffic amount is large, the traffic amount detector 90 elongates the fixed time period for executing only the relay operation. In contrast, when the traffic amount is small, the traffic amount detector 90 shortens the fixed time period for executing only the relay operation.

Figure 10:
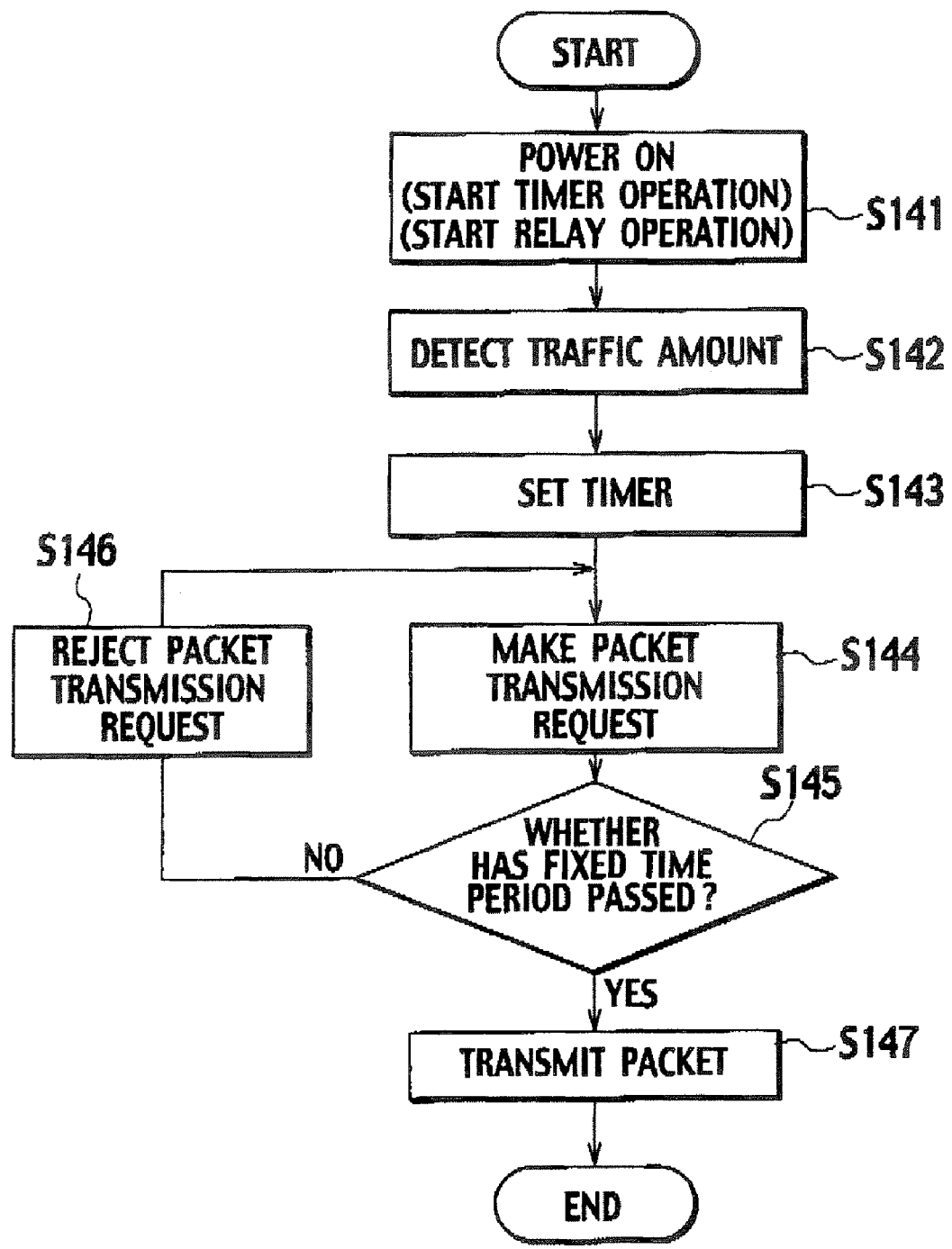
FIG. 10 is a flowchart showing a mobile terminal control method according to the third modification of the first embodiment of the present invention.

Hereinafter, description will be given of a mobile terminal control method of the third modification of the first embodiment by referring to a flowchart shown in FIG. 10.

Once the power is turned on in step S141, a coordination controller 33 issues an instruction to a packet relay unit 10 to start the relay operation, and issues an instruction to a timer 50 to start the time measurement operation.

In step S142, the traffic amount detector 90 detects the traffic amount.

In step S143, the traffic amount detector 90 sets the threshold value (reference time period) in the determination and 32d according to the traffic amount detected in step S142.

In step S144, a packet transmitter 20 informs the coordination controller 33 of a packet transmission request.

In step S145, the determination and 32d determines whether the time period measured by the timer 50 exceeds the threshold value (reference time period), that is, the fixed time period has passed. When it is determined that the fixed time period has not passed after power-on, the procedure goes to step S146. In step S146, the coordination controller 33 rejects the packet transmission request from the packet transmitter 20.

In contrast, when it is determined in step S145 that the fixed time period has passed after power-on, the procedure goes to step S147, and the coordination controller 33 permits the packet transmission request from the packet transmitter 20. Once the packet transmission request is permitted, the packet transmitter 20 transmits the packet to another terminal through the packet relay unit 10.

As has been described above, the mobile terminal 1d of the third modification of the first embodiment is capable of adjusting the fixed time period for executing only the relay operation according to the traffic amount in the ad hoc network 200.

SECOND EMBODIMENT

In the foregoing first embodiment, the descriptions have been given of one example in which the coordination controller 33 causes the packet relay unit 10 to execute the relay operation until the fixed time period passes after power-on. In a second embodiment of the present invention, descriptions will be given of a case where a coordination controller 33 causes a packet relay unit 10 to execute the relay operation from the time of completion of transmission of a packet generated inside a self terminal until a fixed time passes.

In this case, a method for determining the fixed time period makes use of any one of, or a combination of an operating time of a packet transmitter 20; the number of packets transmitted by the packet transmitter 20, the node density in an ad hoc network 200; and the traffic amount in the ad hoc network 200.

Figure 11:
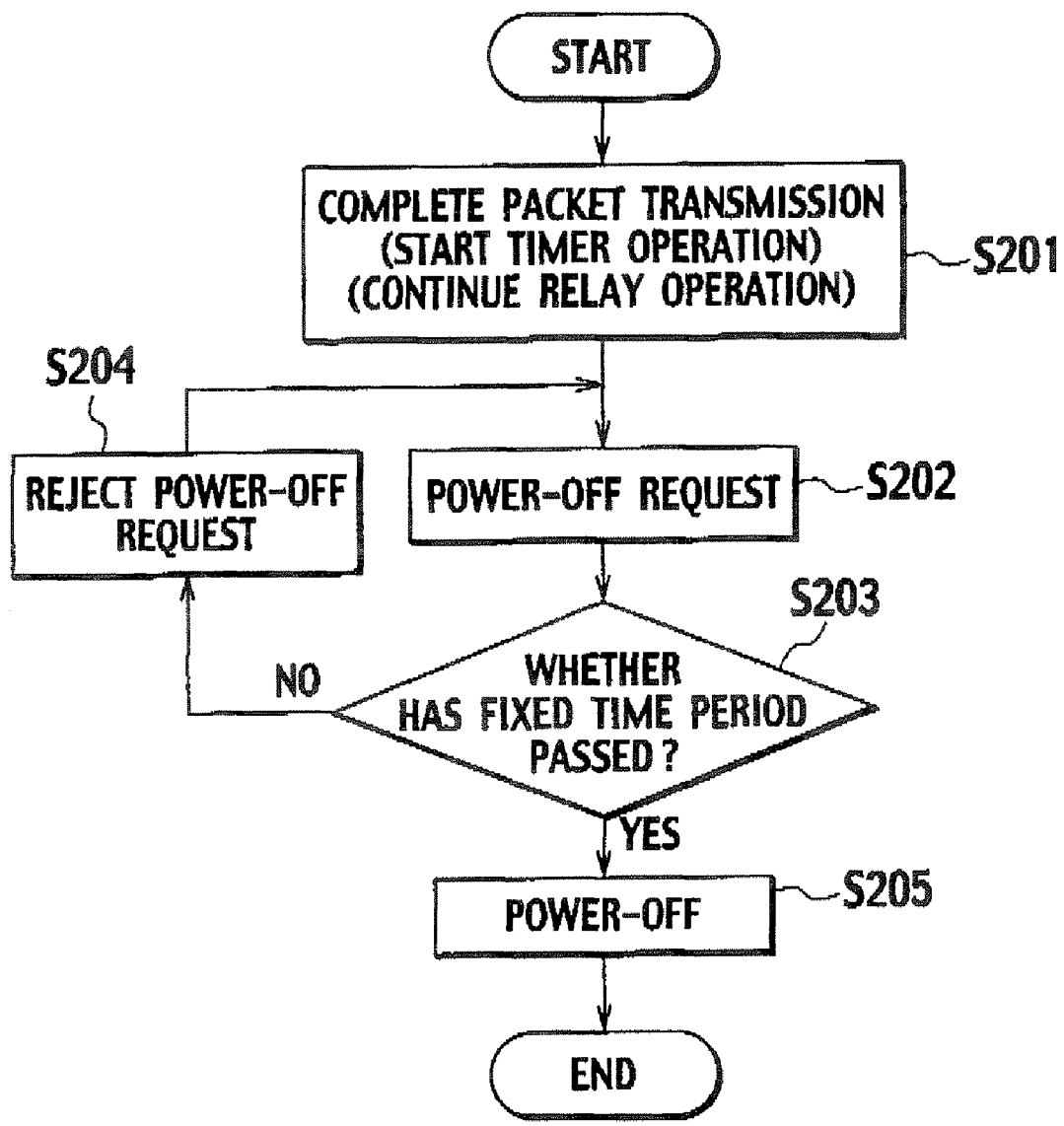
FIG. 11 is a flowchart showing a mobile terminal control method according to a second embodiment of the present invention.

Hereinafter, descriptions will be given of a mobile terminal control method of the second embodiment by referring to FIGS. 2 and 11. Note that it is assumed that both of the packet transmission operation and the packet relay operation have been executed before step S201 in FIG. 11.

In step S201, upon detection of completion of the packet transmission operation, the coordination controller 33 issues an instruction to the packet relay unit 10 to continue the relay operation, and issues an instruction to a timer 50 to start the time measurement operation.

In step S202, a power supply manager 31 informs the coordination controller 33 of a power-off request.

In step S203, the determination unit 32a determines whether the fixed time period has passed since the start of the time measurement operation. When it is determined that the fixed period has not passed since the start of the time measurement operation, the procedure goes to step S204. In step S204, the coordination controller 33 rejects the power-off request.

In contrast, when it is determined that the fixed period has passed since the start of the time measurement operation, the procedure goes to step S205, and the coordination controller 33 permits the power-off request. Once the power-off request is permitted, the power is turned off.

Figure 12:
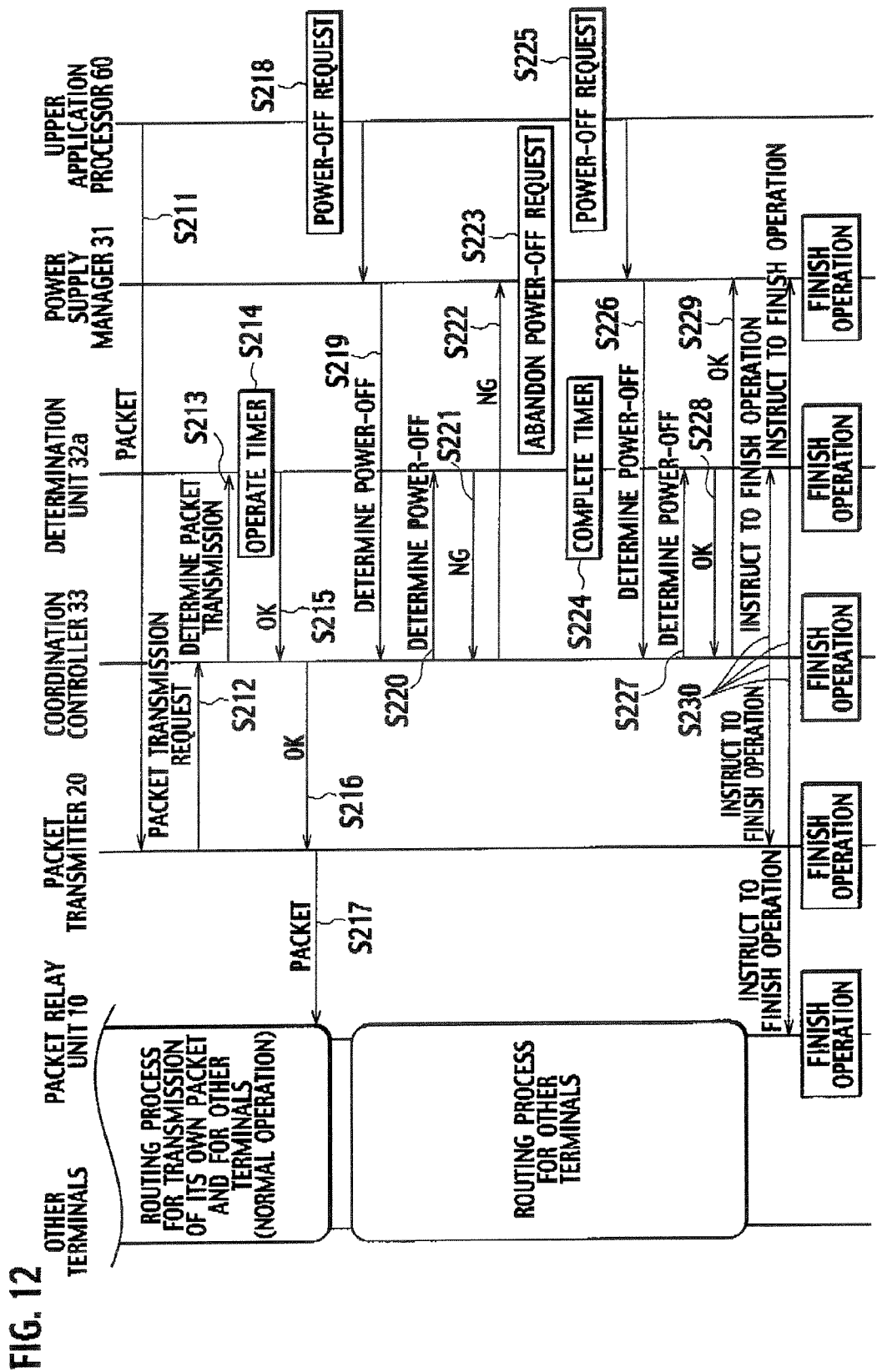
FIG. 12 is a sequence diagram showing the detail operation of the mobile terminal according to the second embodiment of the present invention.

Hereinafter, descriptions will be given in detail of the operation of the mobile terminal 1a of the second embodiment by referring to a sequence diagram shown in FIG. 12.

In step S211, a packet generated by an upper application processor 60 is transmitted to the packet transmitter 20. The packet generated by the upper application processor 60 is temporarily held in the packet transmitter 20.

In step S212, the packet transmitter 20 informs the coordination controller 33 of a packet transmission request.

In step S213, the coordination controller 33 informs the determination unit 32a of the packet transmission request.

In step S214, in response to the packet transmission request informed in step S213, the determination unit 32a detects the completion of the transmission operation, and then causes the timer 50 to start the time measurement operation.

In step S215, the determination unit 32a informs the coordination controller 33 that the packet transmission request is permitted.

In step S216, the coordination controller 33 informs the packet transmitter 20 that the packet transmission request is permitted.

In step S217, the packet transmitter 20 transmits the packet held therein to another terminal through the packet relay unit 10.

In step S218, the upper application processor 60 informs the power supply manager 31 that the user has performed the power-off operation.

In step S219, the power supply manager 31 informs the coordination controller 33 of a power-off request.

In step S220, the coordination controller 33 inquires of the determination unit 32a whether the time period measured by the timer 50 excess the threshold value (reference time period).

in step S221, the determination unit 32a informs the coordination unit 33 that the time period measured by the timer 50 does not exceed the threshold value (reference time period).

In step S222, the coordination controller 33 informs the power supply manager 31 that the power-off request is rejected.

In step S223, the power supply manager 31 rejects the power-off request.

In step S224, the determination unit 32a determines that the time measured by the timer 50 exceeds the threshold value (reference time period). In step S225, the upper application processor 60 informs the power supply manager 31 that the user has performed the power-off operation.

In step S226, the power supply manager 31 informs the coordination controller 33 of a power-off request.

In step S227, the coordination controller 33 inquires of the determination unit 32a whether the time period measured by the timer 50 exceeds the threshold value (reference time period).

In step S228, the dermination unit 32a informs the coordination controller 33 that the time period measured by the timer 50 exceeds the threshold value (reference time period).

In step S229, the coordination controller 33 informs the power supply manager 31 that the power-off request is permitted.

In step S230, the coordination controller 33 issues instructions respectively to the packet relay unit 10, the packet transmitter 20, the determination unit 32a and the power supply manager 31 to terminate the operations.

As has been described, in the second embodiment, the packet relay unit 10 is caused to execute the relay operation from the time of completion of a packet transmission operation until the fixed time period passes. Accordingly, it is possible to prevent the network performance in the ad hoc network 200 from deteriorating, and to ensure the fairness in communications.

THIRD EMBODIMENT

As shown in FIGS. 13 to 16, a mobile terminal 1e according to a third embodiment of the present invention has an arrangement in which a packet relay unit 10 determines whether the mobile terminal 1a holds an active route, and in which a coordination controller 33 rejects a power-off request from a power supply manager 31 when the mobile terminal 1e holds the active route. Here, "holding an active route" means, for example, holding a routing table, or executing the relay operation for data packets. The packet relay unit 10 performs the relay operation (routing protocol), for example, in response to a route request from another terminal. During the relay operation, the packet relay unit 10 confirms the presence of other terminals around the mobile terminal 1e by transmitting radio waves, and then generates a touring table.

For example, in a case of the foregoing AODV routing protocol, when data is transmitted from a source terminal to a destination terminal, a route request packet for searching a route is transmitted in broadcast mode. Upon receipt of the route request packet, each terminal stores a route to the source terminal, and propagates the route request packet by retransmitting it. Upon receipt of the route request packet, the destination terminal transmits a route reply packet. The route reply packed is transmitted to the source terminal through the route reverse to that of the route request packet. The source terminal transmits the data by using the route informed by means of the route reply packet.

During the above procedure, the packet relay unit 10 generates a routing table. When the power is turned off while the packet relay unit 10 is holding the routing table, the route is broken, and this deteriorates the network performance. For this reason, the coordination controller 33 reject a power-off request from a power supply manager 31 while the routing table is being held.

Figure 13:
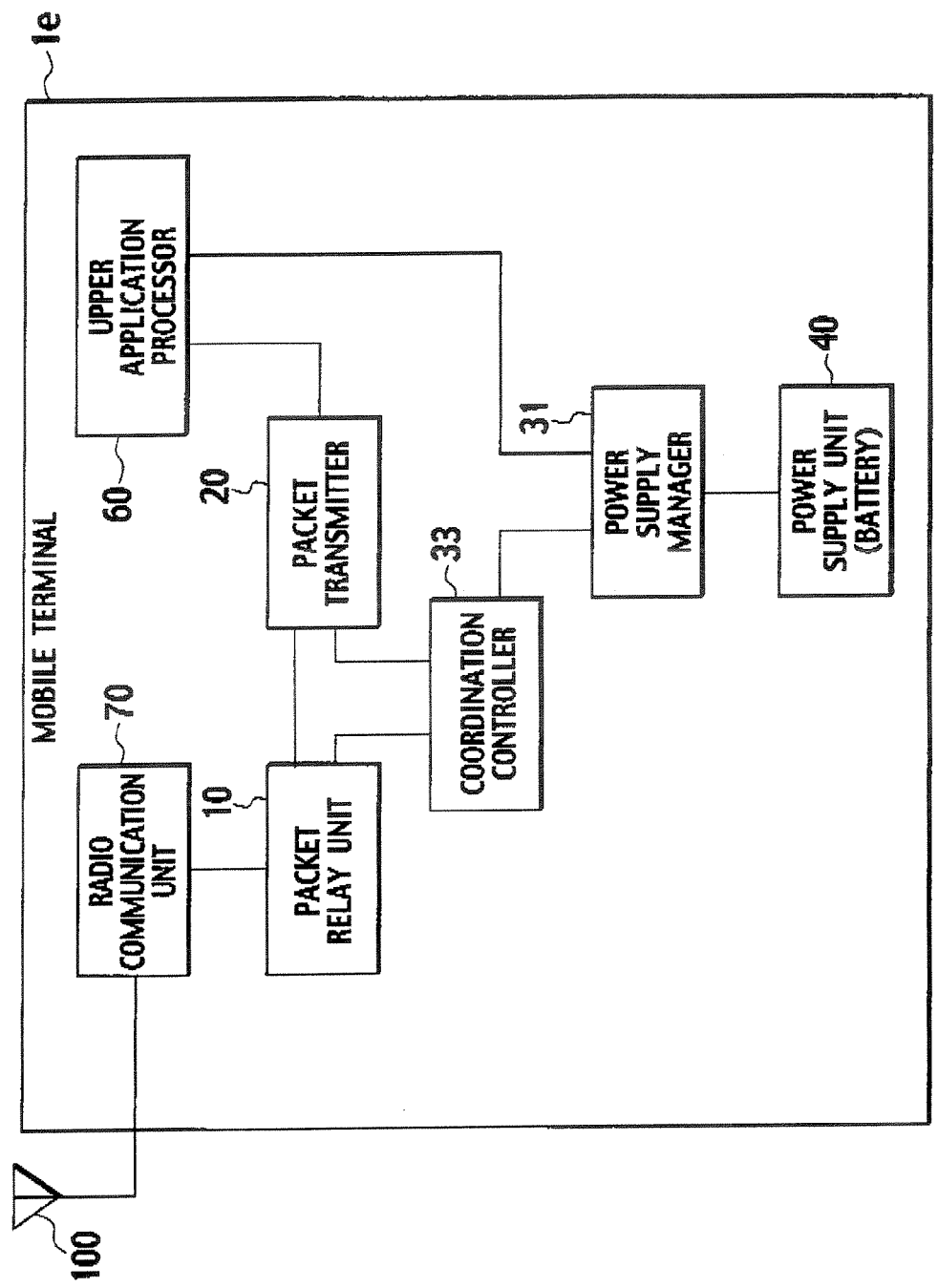
FIG. 13 is a block diagram showing an arrangement example of a mobile terminal according to a third embodiment of the present invention.
Figure 14:
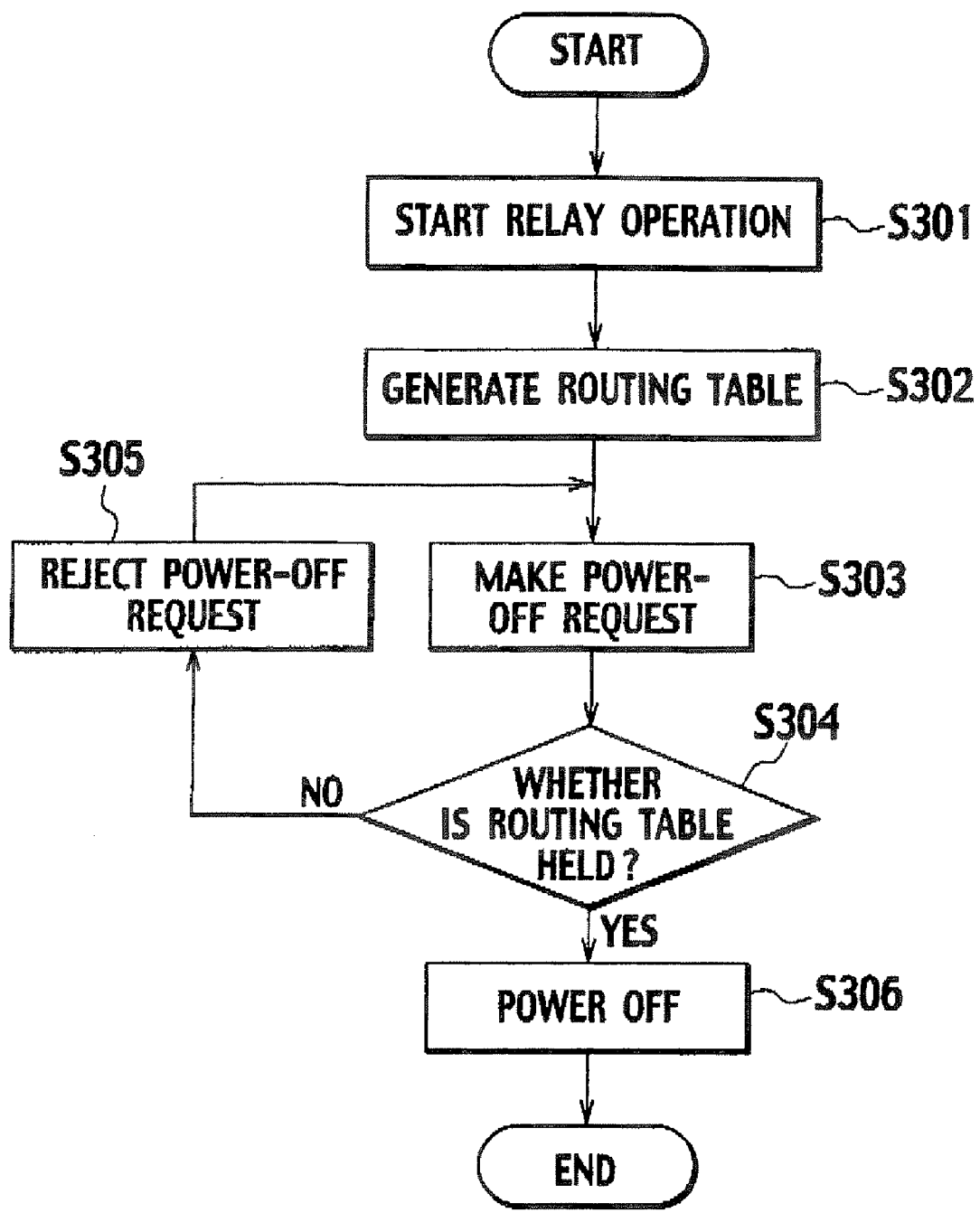
FIG. 14 is a flowchart showing a mobile terminal control method according to the third embodiment of the present invention.

Hereinafter, descriptions will be given of a method for controlling the mobile terminal of the third embodiment by referring to FIGS. 13 and 14.

In step S301, the packet relay unit 10 executes the relay operation (routing protocol) in response to a route request from another terminal.

In step S302, the packet relay unit 10 generates a routing table, and holds therein the routing table thus generated.

In step S303, the power supply manager 31 informs the coordination controller 33 of a power-off request.

In step s304, the coordination controller 33 determines whether the routing table is held in the packet relay unit 10. When it is determined that the routing table is held in the packet relay unit 10, the procedure goes to step S305, and the coordination controller 33 rejects the power-off request.

In contrast, when it is determined that the routing table is not held in the packet relay unit 10, the procedure goes to step S306, and the coordination controller 33 permits the power-off request. Once the power-off request is permitted, the power is turned off.

Modification of Third Embodiment

In the foregoing third embodiment, the following case has been described. Firstly, the packet relay unit 10 determines whether the self terminal holds an active route. Then, when the self terminal holds the active route, the coordination controller 33 rejects a power-off request from the power supply manager 31.

The foregoing third embodiment, however, has a problem that, when a power-off request is made, the power-off request cannot be permitted for as long as the relay operation is being performed.

Accordingly, in a modification of the third embodiment, a self terminal is configured to inform other terminals, to which the self mobile terminal has been set to connect, that the self terminal is about to be powered off, and thereby to prompt the other terminals to switch to another route.

Hereinafter, descriptions will be given of the modification of the third embodiment by referring to FIG. 13.

The packet relay unit 10 operates as a routing technique which sets up a connection between the self terminal and the other terminals in an ad hoc network 200, and which relays packets sent and received between the other terminals. In addition, the packet relay unit 10 performs a power-off advance notice process in response to an instruction from the coordination controller 33.

Here, the "power-off advance notice process" is a process for prompting the other terminals to switch to a different route before the current link is cut off due to the power-off, and this process is achieved by using the multi-path routing technique (as for the multi-path routing technique, refer to R. Leung, J. Liu, E. Poon, A. Chan and B. Li, "MP-DSR: A QoS-Aware Multi-Path Dynamic Source Routing Protocol for Wireless Ad-Hoc Networks," In Proc. Of the 26th Annual Conference on Local Computer Networks (LCN 2001), pp. 139-172, 2001.)

The packet transmitter 20 includes an interface function of interfacing with an upper application processor 60, and serves as an interface between the upper application processor 60 and the routing function (the packet relay unit 10) when the self terminal communicates with another terminal.

The coordination controller 33 includes a function of controlling the routing function (the packet relay unit 10) and the power supply function (the power supply manager 31) so that they can be coordinated with each other. To be more precise, the coordination controller 33 causes the packet relay unit 10, the packet transmitter 20 and the power supply manager 31 to be coordinated with one another. In addition, when the power supply manager 31 makes a power-off request while the packet relay unit 10 is holding an active route, the coordination controller 33 issues an instruction to the packet relay unit 10 to execute the power-off advance notice process for prompting the other terminals to switch to a different route.

Figure 15:
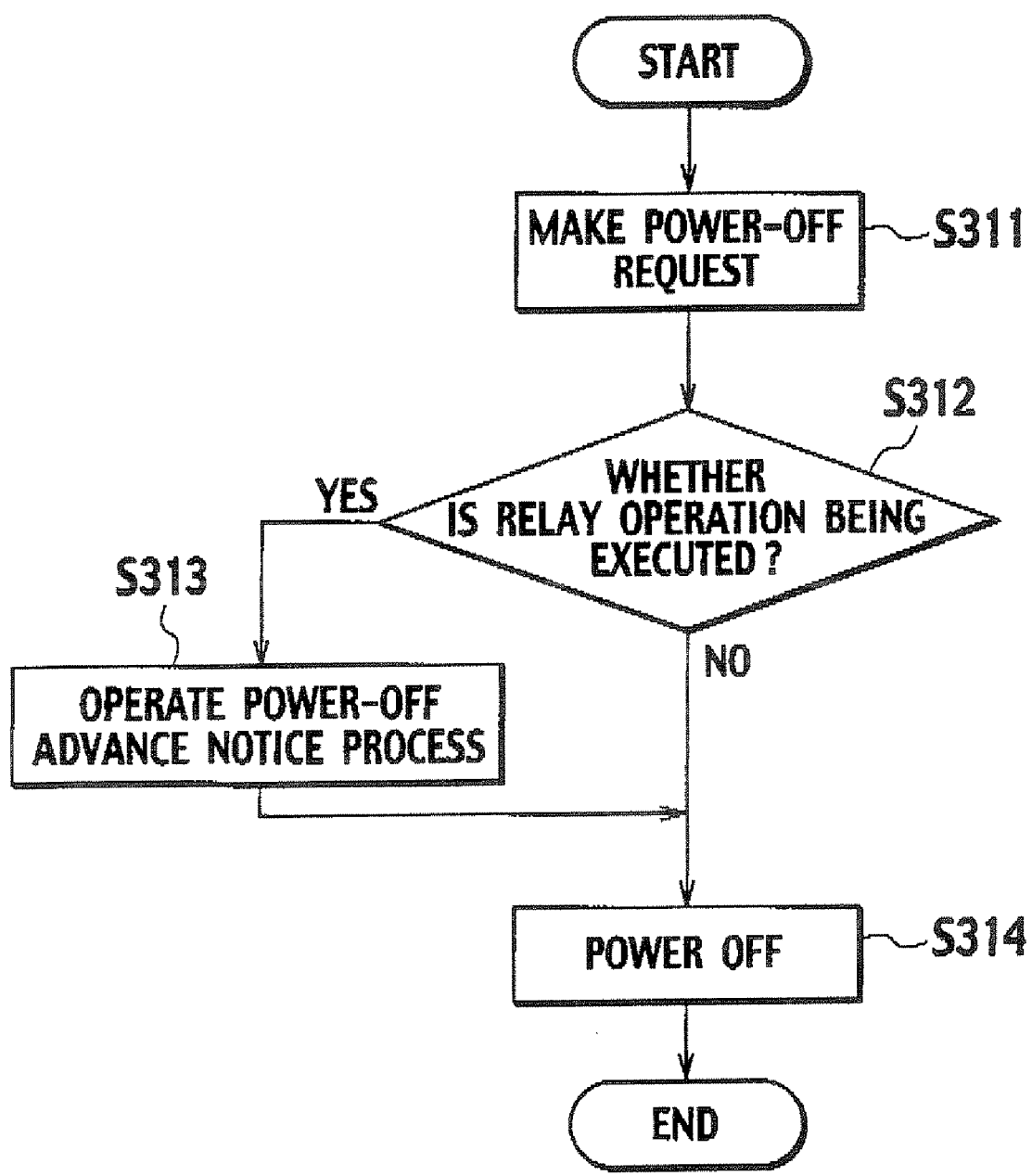
FIG. 15 is a flowchart showing a mobile terminal control method according to a modification of the third embodiment of the present invention.

Hereinafter, descriptions will be given of a method for controlling the mobile terminal of the modification of the third embodiment by referring to FIGS. 13 and 15.

In step s311, the power supply manager 31 informs the coordination controller 33 of a power-off request.

In step S312, the coordination controller 33 determines whether the packet relay unit 10 is executing the relay operation. When it is determined that the packet relay unit 10 is executing the relay operation, the procedure goes to step S313. In contrast, when it is determined that the packet relay unit 10 is not executing the relay operation, the procedure goes to step S314.

In step S313, the packet relay unit 10 executes the foregoing power-off advance notice process.

In step S314, the coordination controller 33 permits the power-off request. Once the power-off request is permitted, the power supply manager 31 turns off the power.

Figure 16:
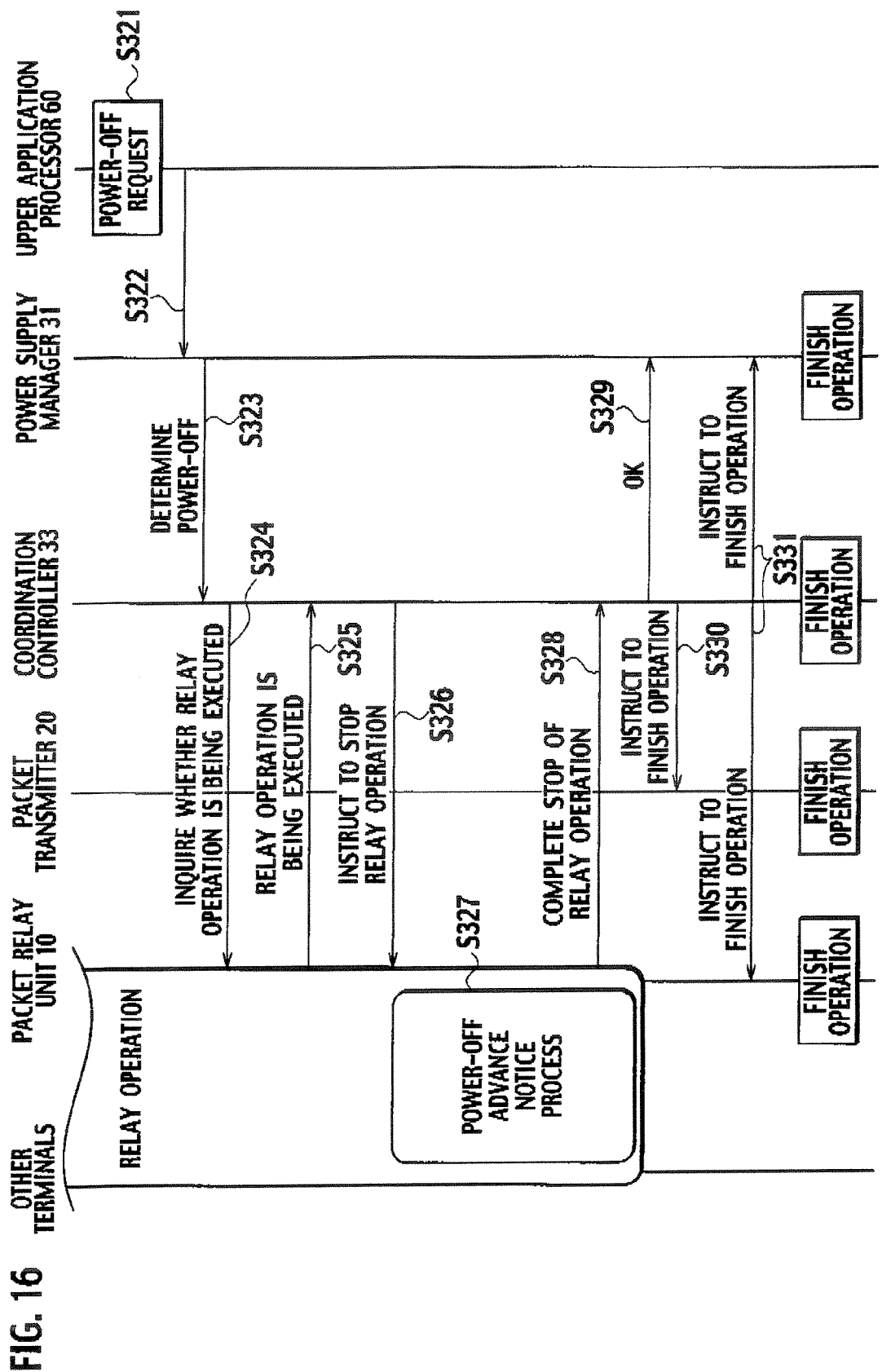
FIG. 16 is a sequence diagram showing the detail operation of the mobile terminal according to the modification of the third embodiment of the present invention.

Hereinafter, the operation of the mobile terminal of the modification of the third embodiment will be described in detail by referring to a sequence diagram shown in FIG. 16.

In step S321, the upper application processor 60 detects a power-off operation performed by a user, and then, in step S322, informs the power supply manager 31 that the user has performed the power-off operation.

In step S323, the power supply manager 31 requests the coordination controller 33 to determine whether the power can be turned off.

In step S324, the coordination controller 33 inquires of the packet relay unit 10 whether the relay operation is being executed. Incidentally, at this moment, the packet relay unit 10 is relaying packets sent and received between the other terminals.

In step S325, the packet relay unit 10 informs the coordination controller 33 that the relay operation is being executed.

In step S326, the coordination controller 33 issues an instruction to the packet relay unit 10 to stop the relay operation.

In step S327, the packet relay unit 10 executes the above-mentioned power-off advance notice process in response to the instruction from the coordination controller 33. Consequently, the route is reconstructed in the ad hoc network 200, and then the relay operation in the packet relay unit 10 is stopped.

In step S328, the packet relay unit 10 informs the coordination controller 33 that the relay operation has been stopped.

In step S329, the coordination controller 33 permits the power supply manager 31 to turn off the power.

In step S330, the coordination controller 33 issues an instruction to the packet transmitter 20 to finish the operation.

In step S331, the coordination controller 33 issues an instruction to the packet relay unit 10 and the power supply manager 31 to finish the operation.

As has been described above, in the modification of the third embodiment, the coordination controller 33 issues an instruction to the packet relay unit 10 to perform the power-off advance notice process for prompting the other terminals to switch to another route. This instruction is made for the purpose of permitting a power-off request which is made by the power supply manager 31 while the packet relay unit 10 at holding an active route (is performing the relay operation). This arrangement allows the self terminal to be turned off at the earliest possible time while preventing the network performance of the ad hoc network 200 from deteriorating.

FOURTH EMBODIMENT

Figure 17:
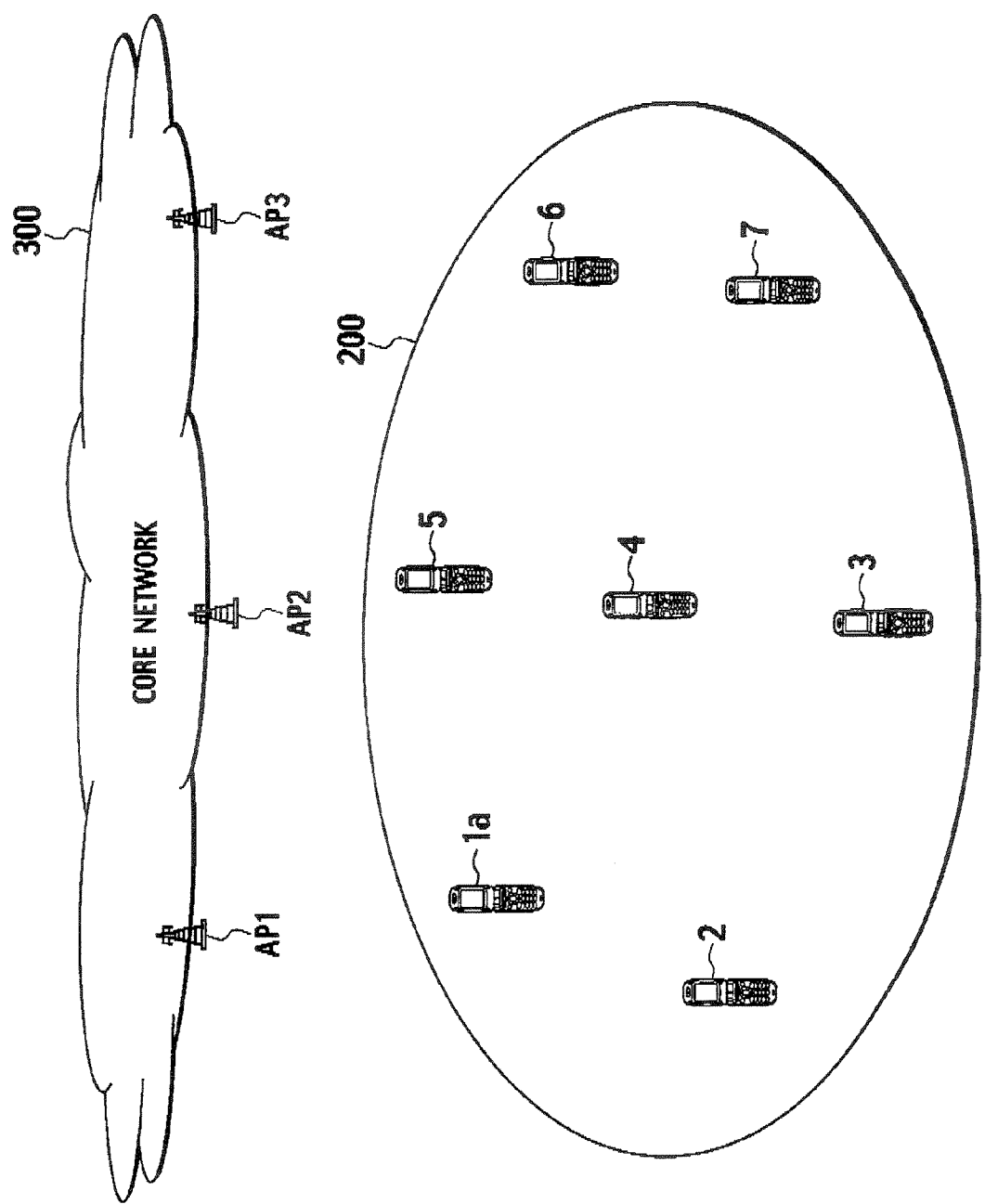
FIG. 17 is a schematic diagram for explaining an ad hoc network and a core network according to a fourth embodiment of the present invention.

As shown in FIG. 17, in a fourth embodiment of the present invention, each of mobile terminals 1a to 7 is configured to be capable of communicating with a core network 300 through access points AP1 to AP3 which are base stations and the like. The core network 300 makes position control, call control and service control of each of the mobile terminals 1a to 7.

Each of the mobile terminals 1a to 7 is connected to the access points AP1 to AP3 through an ad hoc network 200. For this reason, even when a mobile terminal exists outside a coverage area of the access points AP1 to AP3, the mobile terminal can communicate with the access points AP1 to AP3. In such a system, it is possible to cause the core network 300 to execute the functions respectively of the determination units 32a to 32d, the timer 50, the packet counter 80, the node density detector 101 and the traffic amount detector 90, which have been described above.

Accordingly, in the fourth embodiment without changing the arrangement of each mobile terminal to a large extent, the network performance of the ad hoc network 200 can be prevented from deteriorating, and the fairness in communications can be ensured.

OTHER EMBODIMENTS

Although the present invention has been described as the first to fourth embodiments hereinabove, it should not be understood that the descriptions and the drawings constituting a part of this disclosure limit the present invention. From this disclosure, it is obvious for those skilled in the act to find various alternative embodiments, examples and applied techniques.

In the foregoing first embodiment, the descriptions have been given of the mobile terminal control method in which the timer 50 is caused to start when the mobile terminal is powered on, and in which, during the fixed time period, only the packet relay operation is permitted with the packet transmission operation not permitted. In the second embodiment, the descriptions have been given of the mobile terminal control method in which the timer 50 is caused to start after completion of the transmission operation, and in which, during the fixed time period, only the relay operation is permitted with the power-off not permitted. However, the control of mobile terminals can be executed by using both mobile terminal control methods of the first and second embodiments at a time.

Thus, it should be understood that the present invention includes various embodiments and the like which are not described here. Accordingly, the technical scope of the present invention should be limited only by the scope of the invention as defined by the appended claims appropriate for the foregoing description.

What is claimed is:

1. A mobile terminal configured to constitute an ad hoc network together with a plurality of other terminals, comprising:
    a packet relay unit configured to execute a relay operation of relaying a packet transferred between the other terminals;
    a packet transmitter configured to execute a transmission operation of transmitting a packet generated in the mobile terminal to any one of the other terminals;
    a power supply manager configured to execute a power supply control operation, which includes a power-off operation;
    a coordination controller configured to:
        cause the relay operation, the power supply control operation and the transmission operation to be coordinated with each other by selectively controlling whether each of the relay operation, the transmission operation and the power supply control operation is executed;
        prioritize the relay operation over the transmission operation and the power-off operation; and
        reject a packet transmission request from the packet transmitter during a predetermined time period after power-on, and cause only the relay operation to be executed; and
    a determination unit configured to increase the predetermined time period for executing only the relay operation when it is determined that a node density in the ad hoc network is low.

2. The mobile terminal according to claim 1, wherein the determination unit is configured to determine the predetermined time period in accordance with any one of an operation time of the packet relay unit, a node density in the ad hoc network, and a traffic amount in the ad hoc network.

3. The mobile terminal according to claim 1, wherein the coordination controller is configured to reject a power-off request from the power supply manger and a packet transmission request from the packet transmitter, and cause only the relay operation to be executed during a predetermined time period after completion of the transmission operation.

4. The mobile terminal according to claim 3, wherein the determination unit is configured to determine the predetermined time period in accordance with any one of an operation time of the packet relay unit, the node density in the ad hoc network, and the traffic amount in the ad hoc network.

5. The mobile terminal according to claim 1, wherein
    the power supply manager is configured to detect the amount of remaining power at power-on, and
    the coordination controller is configured to reject a packet transmission request from the packet transmitter, and cause only the relay operation to be executed, when the amount of remaining power is less than a fixed amount.

6. The mobile terminal according to claim 1, wherein
    the power supply manager is configured to detect the amount of remaining power at power-on, and
    the coordination controller is configured to cause both of the relay operation and the transmission operation not to be executed when the amount of remaining power is less than a fixed amount.

7. The mobile terminal according to claim 1, wherein
    the packet relay unit is configured to determine whether the mobile terminal holds an active route, and
    the coordination controller is configured to reject a power-off request from the power supply manager when the mobile terminal holds the active route.

8. The mobile terminal according to claim 1, wherein
    the packet relay unit is configured to determine whether the mobile terminal holds an active route, and
    the coordination controller is configured to issue an instruction to the packet relay unit to execute a power-off advance notice process for prompting the other terminals to switch to another route for the purpose of permitting power-off when the power supply manager requests power-off while the mobile terminal holds the active route.

9. The mobile terminal according to claim 1, wherein the determination unit is configured to increase the predetermined time period for executing only the relay operation when it is determined that a traffic amount in the ad hoc network is high.

10. A wireless communication system, comprising:
    a plurality of mobile terminals configured to constitute an ad hoc network; and
    a core network configured to control the mobile terminals,
    wherein each of the mobile terminals comprises:
        a packet relay unit configured to execute a relay operation of relaying a packet transferred between the other terminals;
        a packet transmitter configured to execute a transmission operation of transmitting a packet generated in the mobile terminal to any one of the other terminals; and
        a power supply manager configured to execute a power supply control operation, which includes a power-off operation,
    wherein the core network is configured to:
        cause the relay operation, the transmission operation and the power supply control operation to be coordinated with each other by selectively controlling whether each of the relay operation, the transmission operation and the power supply control operation is executed;
        prioritize the relay operation over the transmission operation and the power-off operation;
        reject a packet transmission request from the packet transmitter during a predetermined time period after power-on, and cause only the relay operation to be executed; and
        increase the predetermined time period for executing only the relay operation when it is determined that a node density in the ad hoc network is low.

11. A mobile terminal control method for controlling a mobile terminal configured to constitute an ad hoc network together with a plurality of other terminals, comprising:
    executing a relay operation of relaying a packet transferred between the other terminals;
    executing a transmission operation of transmitting a packet generated in the mobile terminal to any one of the other terminals;
    executing a power supply control operation, which includes a power-off operation;
    causing the relay operation, the transmission operation and the power supply control operation to be coordinated with each other;

controlling whether each of the relay operation, the transmission operation and the power supply control operation is executed, and prioritizing the relay operation over the transmission operation and the power-off operation;

rejecting a packet transmission request from the mobile terminal during a predetermined time period after power-on, and causing only the relay operation to be executed; and increasing the predetermined time period for executing only the relay operation when it is determined that a node density in the ad hoc network is low.

* * * * *